United States Patent
Schmid et al.

(10) Patent No.: US 10,835,968 B2
(45) Date of Patent: Nov. 17, 2020

(54) MACHINING TOOL

(71) Applicant: KOMET GROUP GMBH, Besigheim (DE)

(72) Inventors: Frank Schmid, Deizisau (DE); Karl-Heinz Edelmann, Ehningen (DE)

(73) Assignee: KOMET GROUP GMBH, Besigheim (DE)

(*) Notice: Subject to any disclaimer, the term of this patent is extended or adjusted under 35 U.S.C. 154(b) by 59 days.

(21) Appl. No.: 16/255,560

(22) Filed: Jan. 23, 2019

(65) Prior Publication Data

US 2019/0151960 A1  May 23, 2019

Related U.S. Application Data

(63) Continuation of application No. PCT/EP2017/068919, filed on Jul. 26, 2017.

(30) Foreign Application Priority Data

Jul. 27, 2016 (DE) .................. 10 2016 113 816

(51) Int. Cl.
*B23B 51/04* (2006.01)
*B23D 77/00* (2006.01)
*B23B 51/06* (2006.01)

(52) U.S. Cl.
CPC ...... *B23B 51/0486* (2013.01); *B23B 51/0493* (2013.01); *B23D 77/006* (2013.01);
(Continued)

(58) Field of Classification Search
CPC .......... B23B 2250/12; B23B 2251/406; B23B 51/0493; B23B 51/0486; B23B 2200/32;
(Continued)

(56) References Cited

U.S. PATENT DOCUMENTS 1,267,704 A * 5/1918 Skrukrud ............ B23B 49/005
  408/191
4,123,193 A * 10/1978 Hill .................... B23B 49/005
  408/202
(Continued)

FOREIGN PATENT DOCUMENTS

DE  196 12 104 A1  10/1997
DE  10305991 A1 * 12/2004 ............. B23C 5/006
(Continued)

OTHER PUBLICATIONS

International Preliminary Report on Patentability, PCT/EP2017/068919, dated Jan. 31, 2019, 5 pages.

*Primary Examiner* — Eric A. Gates
*Assistant Examiner* — Paul M Janeski
(74) *Attorney, Agent, or Firm* — Bose McKinney & Evans LLP

(57) ABSTRACT

This disclosure relates to a machining tool having a base body which is rotatable about a rotary axis and movable in a feed direction along the rotary axis, at least one cutting element which is fixed on the base body and has a front cutting edge pointing in the feed direction, and a flute associated with the cutting element and formed by a recess in the base body. In order to control the chip flow, according to this disclosure, a flute cover mounted on the base body is proposed, which outwardly covers a chip removal area of the flute adjoining the cutting element.

18 Claims, 3 Drawing Sheets

(52) U.S. Cl.
CPC ........... *B23B 51/06* (2013.01); *B23B 2200/32* (2013.01); *B23B 2205/04* (2013.01); *B23B 2210/02* (2013.01); *B23B 2270/30* (2013.01); *B23D 2277/30* (2013.01)

(58) Field of Classification Search
CPC . B23B 2210/02; B23B 2205/04; B23B 51/06; B23B 2251/50; B23D 77/006; B23D 2277/30; Y10T 408/455; Y10T 408/9097; Y10T 407/14
See application file for complete search history.

(56) References Cited

U.S. PATENT DOCUMENTS

| | | | |
|---|---|---|---|
| 4,966,503 A * | 10/1990 | Davidson | ................ B23B 51/06 408/207 |
| 5,733,076 A * | 3/1998 | Basteck | ............... B23D 77/006 408/144 |
| 6,123,489 A | 9/2000 | Reccius et al. | |
| 10,213,848 B2 * | 2/2019 | Koik | ....................... B23C 5/165 |
| 2010/0260558 A1 | 10/2010 | Kress | |
| 2012/0285749 A1 | 11/2012 | Bohn et al. | |

FOREIGN PATENT DOCUMENTS

| | | | | |
|---|---|---|---|---|
| DE | 20 2007 016 817 U1 | 2/2008 | | |
| DE | 10 2008 003 856 A1 | 7/2009 | | |
| DE | 10 2010 021 212 A1 | 11/2011 | | |
| DE | 10 2011 075 769 A1 | 11/2012 | | |
| DE | 10 2013 108 825 B3 | 10/2014 | | |
| DE | 102016111671 B3 * | 8/2017 | ............. | B23B 27/16 |
| EP | 0749795 A1 * | 12/1996 | ........... | B23B 51/048 |
| EP | 2 522 447 A1 | 11/2012 | | |
| EP | 2839913 A1 * | 2/2015 | ............. | B23D 77/14 |
| WO | WO 2009/071288 A1 | 6/2009 | | |

* cited by examiner

MACHINING TOOL

RELATED APPLICATIONS

This application is a continuation of PCT/EP2017/068919, filed Jul. 26, 2017, which claims priority to DE 10 2016 113 816.9, filed Jul. 27, 2016, both of which are hereby incorporated herein by reference in their entirety.

BACKGROUND

This disclosure relates to a machining tool, in particular for boring, drilling or reaming bore holes, having a base body rotatable about an axis of rotation and movable in a feed direction along the axis of rotation, at least one cutting element fixed on the base body, which has a front cutting edge pointing in the feed direction, and a flute assigned to the cutting element, formed by a recess in the base body and configured for the removal of chips generated at the front cutting edge.

In conventional machining tools, for example solid drills, drills, countersinking tools and frictional tools, the flutes are open radially outwards. Due to the centrifugal force, the chips are thrown against the bore wall and can damage it and/or remain in recesses of the component. Often the cooling channel outlets are directed against the chip flow. As a result, the chips are not transported out of the component in a targeted manner, but are even obstructed in their outflow. Chip breaking geometry can ensure short chips. But especially these shorter chips preferably remain in hollow spaces and transverse bores of the component and require a great degree of cleaning effort. The manufactured components have to be subjected to a complex control process regarding remaining residual chips.

SUMMARY

This disclosure teaches an improvement in machining tools known from the prior art that avoids the aforementioned disadvantages and enables a targeted chip removal for achieving high manufacturing quality.

This disclosure is based on the idea of providing a guide body to be simultaneously a chip spoiler. Correspondingly, according to this disclosure, it is proposed that at the flutes of the base body respectively one flute cover is installed, which outwardly covers a chip removal area of the flute adjoining the cutting element. The chips produced at the front cutting edge can thereby be forcibly guided and deliberately discharged to the rear without coming into contact with the bore wall. This is further supported during the tool feed in that constantly new chip material is delivered. The chips can thus also not get into free spaces of the component but are completely routed to the end of the flute and transported to the outside.

A particularly preferred embodiment provides that the flute cover is formed as a molded part or 3D-printing part additively constructed from a powder material or is formed in particular by selective laser melting. This makes it possible to create the flute cover as a complex molded part embodying a variety of functionalities.

Within this context it is also advantageous if the flute cover has an inner chip-guiding contour delimiting the chip removal area and is formed by varying wall strength. In so doing, the removal of the chips can be process-reliably ensured, and the wear of the base body can be reduced.

Advantageously, the flute cover has a side wall engaging as a segment in sections around the axis of rotation, preferably over an angular range of less than 180°, so that the chips are discharged without touching the bore wall. To create a homogeneous tool body, it is advantageous if the outside of the side wall is formed as a partial cylinder and adjoins flushly with the adjacent outer contour of the base body.

A further advantageous embodiment of the chip guide provides that the flute cover has a front wall pointing in the feed direction and covering the chip removal area while keeping a chip inlet opening free. The front wall thus prevents the machined material from unintentionally escaping again on the face side.

In order to prevent a collision with the base of the bore, it is advantageous if the shape of the front wall of the flute cover is adapted to the contour of the front cutting edge generated in a workpiece to be machined.

A further improvement is achieved in that the front wall of the flute cover is disposed at an axial distance to the front cutting edge of the cutting element so that the machining process is not impeded.

Within this context, it is also advantageous if the axial distance is specified as a function of the feed per revolution of the base body and/or the number of cutting elements. For introducing the generated chips into the closed chip removal area, it is advantageous if between the flute cover and the cutting edge of the cutting element a chip inlet opening is kept free.

Since the cutting speed is lower towards the axis of rotation and rather chip balls are formed there, the opening width of the chip inlet opening should be greater in a radially inner area than in a radially outer area.

In order to be able to safely accommodate the chipping volume, it is advantageous if the opening width of the chip inlet opening is in the range of 0.2 to 1.0 mm.

A further advantageous embodiment provides that the flute has a flute outlet kept free from the flute cover. Preferably, the flute outlet is always situated outside of the workpiece, the axial extension of the flute cover being respectively adapted.

In a particularly preferable embodiment, a coolant channel is passed through a wall portion of the flute cover so that, in addition to cooling in the area of the cutting edge, the chip removal is also supported.

Within this context, it is also advantageous if the coolant channel, at least in sections, extends in a spatially curved manner and optionally is guided arcuately past a screw channel of the flute cover.

Advantageously, the coolant channel runs via an outlet opening oriented against the feed direction into the chip removal area, so that the coolant stream promotes the chip removal.

In order to ensure a reliable coolant flow also for small transverse sections, it is advantageous if the passage cross section of the coolant channel preferably decreases continuously in its through-flowing direction.

For a secure fastening to the base body, it is advantageous if the flute cover has an extension for the head-sided mounting of a fastening screw preferably screwable into the base body and if the extension positively engages into a flank of the flute.

Further advantageous embodiments provide that
the cutting elements are soldered onto the base body or are configured as a replaceable cutting insert;
the cutting element is selected from a material formed from the group of polycrystalline diamond, CVD thick film diamond, ceramic, hard metal or cermet;

the base body is conventionally manufactured by final machining; and the base body at its rearward end has an interface for connecting a machine spindle.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
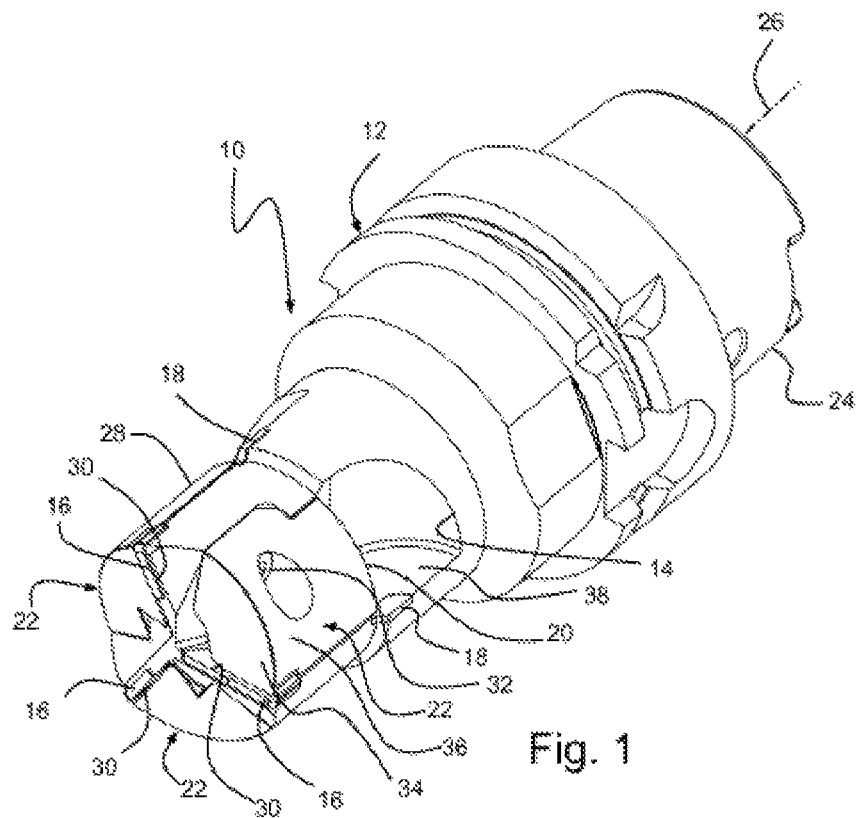
FIG. 1 shows a machine boring tool for drilling into a workpiece having a flute cover in a perspective view.

The embodiments described below are not intended to be exhaustive or to limit the invention to the precise forms disclosed in the following description. Rather, the embodiments are chosen and described so that others skilled in the art may appreciate and understand the principles and practices of this disclosure.

Boring tool 10 illustrated in the drawing includes a base body 12, a plurality of cutting elements 16, 18 fixed in groups in the area of flutes 14 of base body 12, and flute covers 22 individually assigned to flutes 14 and outwardly covering chip removal area 20 of the flutes.

Figure 2:
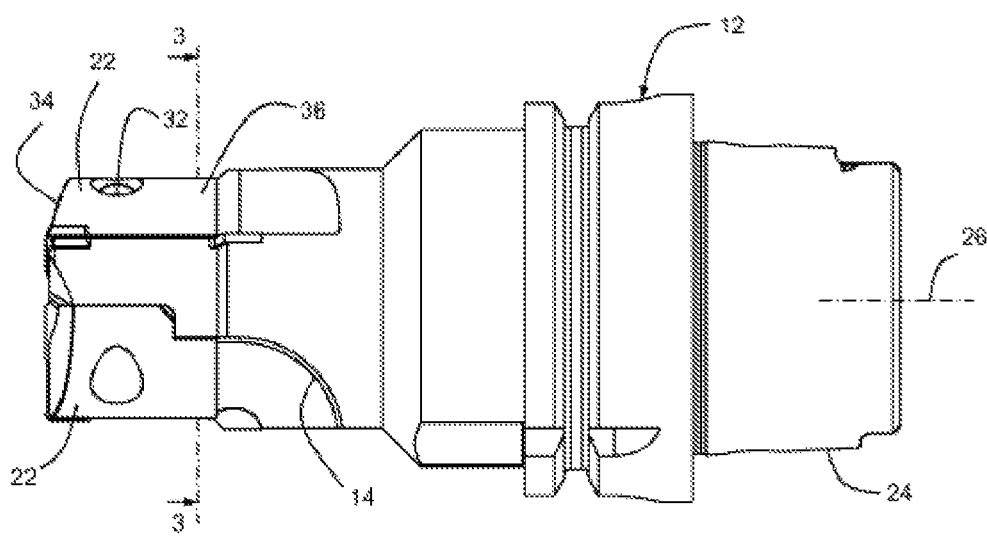
FIG. 2 shows a side view of the tool according to FIG. 1.

As can be seen from FIGS. 1 and 2, base body 12 at its rear-sided section has a clamping part 24 suitable for clamping into a spindle of a machine tool, for example an ABS interface. In this instance, boring tool 10 can be actuated about a rotary axis 26 and at the same time can be moved by feed in the direction of rotary axis 26. Base body 12 is conventionally made from a tool steel and is formed by machining into its shown end form which is cylindrically stepped to the front. In this instance, three flutes 14 are inserted starting from the front wall of the tool as a straight groove having flanks positioned at an acute angle to one another in a stepped shaft 28 forming the tool head.

A group of three front cutting elements 16 spaced apart from each other at an angular distance of 120° have respectively one front cutting edge 30 which runs substantially perpendicular to rotary axis 26. A long cutting edge is stepped radially outwards, while the other two cutting edges from the outside overlap by half the radius. In a conical section of stepped shaft 28, a further group of three cutting elements 18 is attached for lowering the blind borehole produced by front cutting edges 30.

Cutting elements 16, 18 can be soldered as PKD (also referred to as polycrystalline diamond, or PCD) cutting edges onto base body 12. Conceivable is also the use of replaceable cutting inserts, which optionally are fastened to base body 12 via cassettes.

Flute covers 22 are additively or generatively configured as separate molded parts (see FIG. 5) by selective laser melting. In this 3D shaping or printing method a thin layer of a powder material is applied to a construction platform. Then, the powder material is locally re-melted with the aid of a laser so that a firm layer of material forms after solidification. Once the material has solidified, the construction platform is lowered according to the layer thickness and a new layer of powder is applied. In this way, tools or molds can be omitted, the molded blank being produced with great freedom of geometry. Selective laser melting (SLM) is thus an additive process in contrast to the subtractive machining of base body 12.

Flute covers 22 are respectively releasably screwed to base body 12 with the aid of a fastening screw 32. The flutes have a front wall 34, which points in the feed direction and lies essentially in a radial plane with respect to the rotary axis, and a side wall 36, which engages around rotary axis 26 in a segment-like manner.

The shape of front wall 34 is adapted to the contour of the front cutting edge. Furthermore, the front wall is disposed at an axial distance from cutting edge 30 of associated front cutting element 16. This distance corresponds at least to the revolution feed per front cutting element 16. The more cutting elements 16 are present, the smaller the axial distance can be selected. In this way, a trouble-free cutting process is made possible and a collision of front wall 34 with the base of the workpiece bore is avoided.

Figure 3:
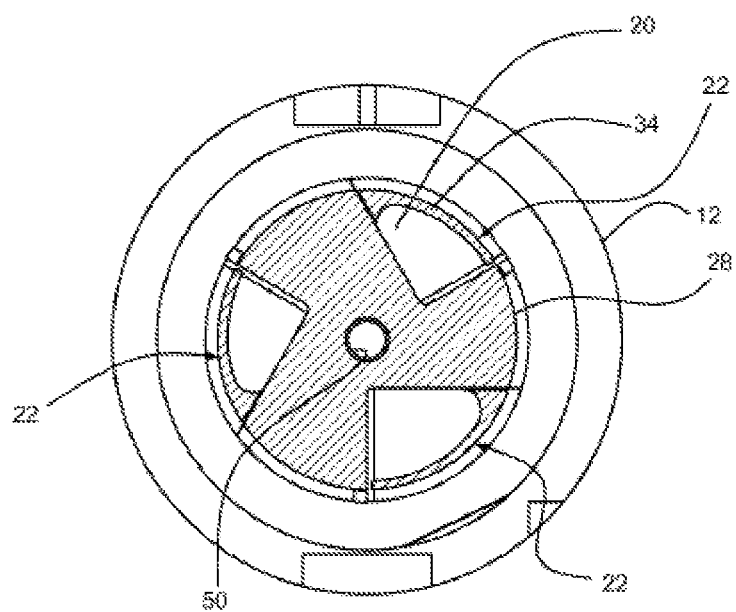
FIG. 3 shows a radial section along line 3-3 of FIG. 2.

As can be seen also from FIG. 3, side wall 34 of flute cover 22 is designed to be partially cylindrical, so that a flush outer contour with the outside of base body 12 and an overall homogeneous tool body is achieved. Chip removal area 20 is thus completely closed radially outwards. As a result, the generated chips cannot get into the free spaces of the workpiece or component and are completely passed to open outlet 38 of flute 14 and from there are transported to the outside.

Figure 4:
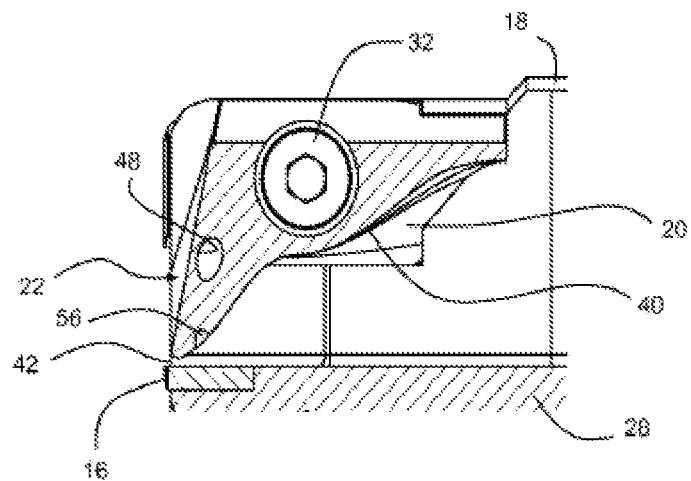
FIG. 4 shows a detailed axial section of the tool in the area of the flute cover.
Figure 5:
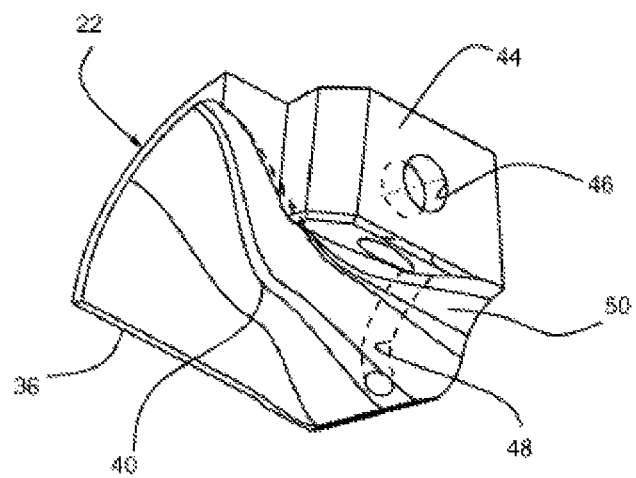
FIG. 5 shows the flute cover in a perspective view.

As can best be seen in FIGS. 4 and 5, flute cover 22 has an inner chip guiding contour 40, which delimits chip removal area 20 and provides for an optimized chip flow. In so doing, it can also be achieved that no washouts result from the chip flow at base body 12. Chip guiding contour 40 is designed such that the chip removal area 20 is widened against the feed direction.

FIG. 4 also shows that a gap-shaped chip inlet opening 42 is kept free between flute cover 22 and cutting element 16. The opening width of the chip inlet opening depends on the feed rate and the generated chip thickness and is to be between 0.2 and 1.0 mm. Expediently, the opening width of chip inlet opening 42 is greater in a radially inner area than in a radially outer area so to still be able to absorb chips that have been more heavily squeezed due to the lower cutting speed.

FIG. 5 shows flute cover 22 as a separate molded part, onto which an extension 44 for the head-sided mounting of fastening screw 32 is formed. For this purpose, extension 44 has a screw 46, which in the mounted state runs tangentially to rotary axis 26. In order to ensure a defined connection even under load, extension 44 is designed as a form-locking body, which engages positively in a complementary contour in the flank of flute 14.

FIG. 5 also illustrates in dashed lines a coolant channel 48 which is passed through a wall portion 50 of flute cover 22 and thereby follows a spatially curved course. In this instance, coolant channel 48 is guided arcuately past screw channel 46. Expediently, the passage cross-section of coolant channel 48 is designed to vary, so that no sinking spaces result and a lubrication using minimal quantities is made possible. Such geometrically complex shaping is practically only possible by the additive manufacturing process.

Figure 6:
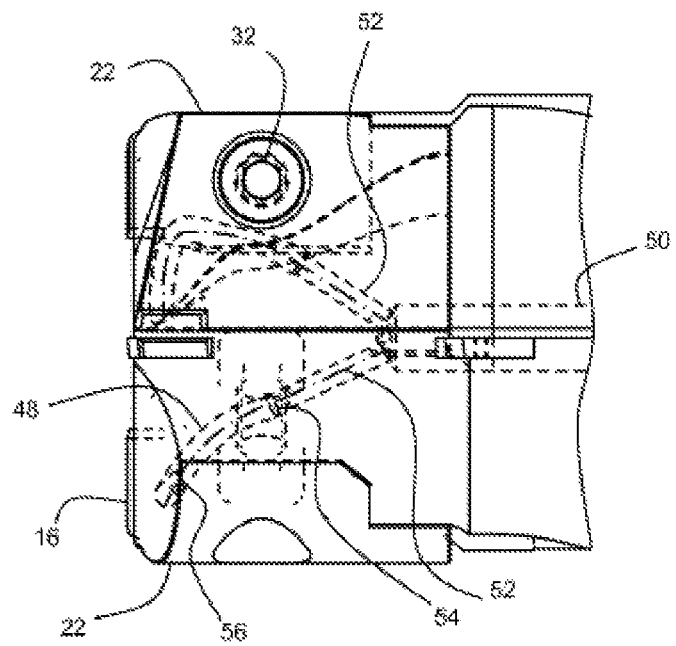
FIG. 6 shows the course of coolant channels through the head of the tool.

As shown in FIG. 6, the coolant or the cooling lubricant is fed from the rear side of tool 10 via a central feed channel 50 into base body 12. From there, oblique bores 52 extend via a connection point 54 of flute covers 22 to the respective coolant channel 48. The course of the coolant channel is situated in an arc shape so that the coolant discharge takes place via an outlet opening 56 against the feed direction. In this way, the chip flow in the direction of flute outlet 38 can be purposefully supported and the maximum backwashing effect can be achieved.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A machining tool for boring, drilling or reaming bore holes, comprising:
    a base body rotatable about a rotary axis and movable in a feed direction along the rotary axis;
    a cutting element fixed on the base body and having a front cutting edge pointing in the feed direction;
    a flute assigned to the cutting element and formed by a recess in the base body;
    a flute cover installed at the base body, the flute cover outwardly covering a chip removal area of the flute adjoining the cutting element; and
    a coolant channel which at least in sections runs in a spatially curved manner and is passed through a wall portion of the flute cover;
    wherein the flute cover is formed as a molded part additively constructed from a powder material.

2. The machining tool as recited in claim 1, wherein the flute cover is formed by selective laser melting.

3. The machining tool as recited in claim 1, wherein the flute cover has an inner chip guiding contour delimiting the chip removal area.

4. The machining tool as recited in claim 1, wherein the flute cover has a side wall engaging in sections around the rotary axis.

5. The machining tool as recited in claim 4, wherein the outside of the side wall is partially cylindrical and is flush with the adjacent outer contour of the base body.

6. The machining tool as recited in claim 1, wherein the flute cover has a front wall pointing in the feed direction.

7. The machining tool as recited in claim 6, wherein the front cutting edge generates a contour of a front cutting edge in a workpiece to be processed and the shape of the front wall of the flute cover is adapted to the contour of the front cutting edge.

8. The machining tool as recited in claim 6, wherein the front wall of the flute cover is disposed at an axial distance to the front cutting edge of the cutting element.

9. The machining tool as recited in claim 8, wherein the axial distance is determined by the number of cutting elements.

10. The machining tool as recited in claim 1, wherein an opening width of a chip inlet opening is greater in a radially inner area than in a radially outer area, whereby, between the flute cover and the cutting edge of the cutting element, the chip inlet opening is kept free.

11. The machining tool as recited in claim 10, wherein the opening width of the chip inlet opening is in the range of 0.2 to 1.0 mm.

12. The machining tool as recited in claim 1, wherein the flute has a flute outlet that is uncovered by the flute cover.

13. The machining tool as recited in claim 1, wherein the coolant channel is guided arcuately past a screw channel of the flute cover.

14. The machining tool as recited in claim 1, wherein the coolant channel runs via an outlet opening oriented against the feed direction into the chip removal area.

15. The machining tool as recited in claim 1, wherein the cross section of the coolant channel in its through-flowing direction diminishes continuously.

16. The machining tool as recited in claim 1, wherein the flute cover has an extension for head-sided mounting of a fastening screw.

17. The machine tool as recited in claim 16, wherein the fastening screw is screwable into the base body and the extension positively engages into a flank of the flute.

18. The machining tool as recited in claim 1, wherein the cutting element is soldered onto the base body or is configured as a replaceable cutting insert.

\* \* \* \* \*